United States Patent
Bandola et al.

(10) Patent No.: US 9,982,818 B2
(45) Date of Patent: May 29, 2018

(54) SHAPE MEMORY ALLOY SEALING RING AND ASSEMBLY

(71) Applicant: HS Wroclaw Sp. z o.o., Wroclaw (PL)

(72) Inventors: Pawel Bandola, Wroclaw (PL); Mikolaj Niewodniczański, Wysoka (PL)

(73) Assignee: HS WROCLAW SP. Z O.O., Wroclaw (PL)

( * ) Notice: Subject to any disclaimer, the term of this patent is extended or adjusted under 35 U.S.C. 154(b) by 0 days. days.

(21) Appl. No.: 15/348,195

(22) Filed: Nov. 10, 2016

(65) Prior Publication Data

US 2017/0146163 A1    May 25, 2017

(30) Foreign Application Priority Data

Nov. 23, 2015  (EP) ..................................... 15461576

(51) Int. Cl.
| | |
|---|---|
| *F16L 21/02* | (2006.01) |
| *F16J 15/08* | (2006.01) |
| *F16J 15/16* | (2006.01) |
| *F16L 21/035* | (2006.01) |
| *F16L 25/00* | (2006.01) |
| *G01L 19/00* | (2006.01) |

(52) U.S. Cl.
CPC ........... *F16L 21/02* (2013.01); *F16J 15/0806* (2013.01); *F16J 15/164* (2013.01); *F16L 21/035* (2013.01); *F16L 25/0072* (2013.01); *G01L 19/00* (2013.01)

(58) Field of Classification Search
CPC ....... F16J 15/0806; F16J 15/164; F16L 21/02; F16L 21/035
See application file for complete search history.

(56) References Cited

U.S. PATENT DOCUMENTS

| | | | | |
|---|---|---|---|---|
| 3,595,588 | A | * | 7/1971 | Rode .................... F16J 15/0887 277/647 |
| 4,537,406 | A | * | 8/1985 | Hirasuna ............. E21B 17/0423 277/314 |
| 2002/0074742 | A1 | | 6/2002 | Quoiani |
| 2007/0241516 | A1 | | 10/2007 | Efremov |
| 2008/0061510 | A1 | * | 3/2008 | Li ........................... E21B 33/00 166/382 |
| 2008/0267770 | A1 | * | 10/2008 | Webster ................ F01D 11/005 415/173.1 |
| 2012/0286480 | A1 | | 11/2012 | Efremov |

(Continued)

FOREIGN PATENT DOCUMENTS

| | | |
|---|---|---|
| EP | 1467066 A2 | 10/2004 |
| EP | 2910822 A1 | 8/2015 |
| WO | 2013148424 A1 | 10/2013 |

OTHER PUBLICATIONS

European Search Report for Application No. 15461576.9-1751 dated Apr. 26, 2016. 7 Pages.

(Continued)

*Primary Examiner* — Gilbert Y Lee

(74) *Attorney, Agent, or Firm* — Cantor Colburn LLP

(57) ABSTRACT

A shape memory alloy (SMA) sealing ring is deformed to provide a shape between a radially inner sealing portion and radially outer sealing portion thereof which has at least one peak and at least one trough. When the shape memory behavior of the SMA is activated, this shape provides a sealing connection between a first and second member.

11 Claims, 3 Drawing Sheets

(56) References Cited

U.S. PATENT DOCUMENTS

2013/0248751 A1* 9/2013 Anderson .............. F16K 1/465
   251/359
2014/0361499 A1* 12/2014 Gupta .................. F01D 11/005
   277/650
2015/0233261 A1* 8/2015 Hodgkinson ......... F01D 11/005
   277/594
2015/0322807 A1* 11/2015 Budnick ................ F01D 9/041
   277/654

OTHER PUBLICATIONS

J.M. Gallardo, et al. Phase Change Behavior of Nitinol Shape Memory Alloys Advanced Engineering 2002, 4, No. 7. pp. 437-451(15 pages).

* cited by examiner

SHAPE MEMORY ALLOY SEALING RING AND ASSEMBLY

FOREIGN PRIORITY

This application claims priority to European Patent Application No. 15461576.9 filed Nov. 23, 2015, the entire contents of which is incorporated herein by reference.

BACKGROUND

In certain applications it is desirable to provide a sealed connection between two members. In one such application, it may be desirable to seal a tube within a housing, for instance, sealing an inlet tube within the housing of a differential pressure flow meter/sensor. In traditional methods, such a seal may be achieved by brazing or bonding a sealing member between the tube and the housing. Such methods may be difficult, particularly if the tube and housing are made of different materials, and may also be inconvenient or expensive. Alternative mechanical connections may also be difficult to implement, given the size tolerances of the required fitting. In addition, operating conditions, mechanical fatigue and thermal expansion differences may cause such connections to fail.

An improved sealing connection may be achieved by using a shape memory alloy (SMA) sealing member. Shape memory alloys (SMAs) are materials that have the ability to return to a predetermined shape when heated above a transformation temperature (i.e. "hot" state). When below their transformation temperature SMAs exist in a martensitic phase which has a low yield strength that can be easily deformed into a new shape (i.e. "cold" state). Once heated above the transformation temperature, the SMA reverts back to an austenitic crystal structure and recovers its previous shape. If the SMA faces any resistance during transformation it can generate large forces, which can be used to provide a sealing interface.

This behaviour allows one to deform a sealing member to a shape that may be passed easily around a first member for sealing between the first member and a second member, and then activate a subsequent sealing action by heating it, so it attempts to return to its original shape between the two members. This may make SMA sealing members simpler to install and more cost-effective than the aforementioned methods.

Additionally, when above the transformation temperature, the SMA may exhibit pseudoelastic behaviour. This advantageously allows the SMA to absorb high strains whilst maintaining a certain stress or sealing force, which gives such sealing members a high fatigue resistance and allows their use in demanding environments. Such effects are well known in the art and are described in detail in, for example, "*Phase Change Behaviour of Nitinol Shape Memory Alloys*" by J M Gallardo et al.—*Advanced Engineering Materials* 2002, 4, No. 7 and US Patent Application 2002/0074742 (Quoiani).

SUMMARY

In accordance with the present disclosure, there is provided a sealing ring comprising a shape memory alloy (SMA) body extending from a radially inner sealing portion to a radially outer sealing portion in a wave-like shape comprising at least one peak and at least one trough.

The term "wave-like shape" should be understood to refer to a shape formed by a continuous path that undulates over a peak and then into a trough, or vice versa.

The trough may be any concave portion, while the peak may be any convex portion, followed by the surface of the SMA body, when viewed from one side of the surface.

The ring may comprise first and second opposed surfaces, each extending from the radially inner sealing portion to the radially outer sealing portion.

For example, when the ring is positioned horizontally, so that the axis of the ring is substantially vertical, the first and second surfaces may be upper and lower surfaces.

The inner and outer sealing portions may extend for a distance along the first and/or second surface from the inner and outer (circumferential) edges of the body respectively.

A portion of the first surface may define the radially outer sealing portion and a portion of the second surface may define the radially inner sealing portion. In other words, the first and second sealing portions may be formed on different surfaces.

Alternatively, the first and second sealing portions may be formed on the same surface.

The wave-like shape may be generally S-shaped. In other words, the body may comprise only one peak and only one trough between the radially inner and outer sealing portions.

The S-shape may be a curved S-shape, or may be a square S-shape, i.e. a square wave.

The wave-like shape may be generally sinusoidal.

Alternatively, the wave-like shape may be a general zigzag shape. For example, the wave-like shape may be a general Z-shape, a general W-shape or a general M-shape.

Alternatively, the wave-like shape may be a curved W-shape or M-shape.

The sealing ring may be axisymmetric, i.e. have cylindrical symmetry about the axis of the ring. As such, the wave-like shape may have a consistent shape around the entire circumference of the ring.

The radially inner and outer sealing portions may each be substantially planar. This may provide larger sealing surfaces.

The body may be shaped such that the planar sealing portions each extend substantially parallel to the axial direction of the sealing ring.

The ring may be resilient in the radial direction, i.e. the inner and outer sealing portions may provide a radial restoring force when compressed radially, or put another way, the sealing portions may resist radial compression. The at least one peak and trough, together with the material of the ring, may provide the resilience.

The ring may be configured such that heating the ring above the transformation temperature of the SMA causes the radially inner sealing portion to move radially inwardly and the radially outer sealing portion to move radially outwardly. In other words, heating may cause the ring to flatten out so that its extension (or height) in the axial direction is reduced (i.e. the peak(s) and/or trough(s) become less pronounced), and its width in the radial direction (measured between its radially inner and outer edges) is increased.

Heating the body may cause the SMA to undergo an irreversible (one-way) martensitic to austenitic phase transformation.

Alternatively, heating the body may cause the SMA to undergo a reversible (two-way) martensitic to austenitic phase transformation.

In accordance with any of the above described embodiments and the present disclosure in general, any suitable shape memory alloy (SMA) may be used, as is known in the art (e.g. an alloy of Fe—Mn—Si, Cu—Zn—Al, Cu—Al—Ni or Ni—Ti (Ni—Ti—X)).

In general, the shape memory phase transformation of SMAs does not occur at one particular temperature, but rather over a temperature range, beginning at a start temperature (As or Ms) and completing at a finish temperature (Af or Mf). In addition, the transformation temperatures upon heating from martensite to austenite (As, Af) and cooling from austenite to martensite (Ms, Mf) may be different. The start and finish temperatures can be tailored by cold working and/or annealing the alloy, as well as by using additional alloying elements, as is well-known in the art. The external stress on the alloy may also affect the transformation temperature.

As mentioned above, the SMA may have a one-way shape memory effect or a two-way shape memory effect. As is known in the art, an alloy exhibiting a one-way shape memory effect, once cooled to the martensitic phase and then heated to the austenitic phase, will not be able to return to the "cold" shape it had in the martensitic phase, even if it is cooled below Mf again. Alternatively, a two-way shape memory effect can be "trained" into the alloy, such that the alloy will return to pre-determined "cold" shape, in addition to the "hot" shape. Such "training" can be achieved via thermo-mechanical treatments, as are known in the art and are available through SMA suppliers.

As will be appreciated, one-way and two-way SMAs can provide different usage characteristics. A one-way SMA will remain sealed even at temperatures below its transformation temperature, which may be useful in low temperature conditions (e.g. at high altitude), whereas a two-way SMA may allow easier maintenance and replacement of the seal, as localised cooling can be used to remove the seal when replacement is necessary. Thus, a one-way or a two-way SMA may be used within the scope of this disclosure, depending on the intended sealing application, as will be appreciated by one skilled in the art.

A particularly suitable SMA for use in the present disclosure is an Ni—Ti alloy, and more specifically a one-way Nitinol may be used.

Nitinol is a Ni—Ti alloy with roughly equal atomic percentages of Ni and Ti (i.e. between 50 at. % Ni 50 at. % Ti to 60 at. % Ni 40 at. % Ti). Nitinol is typically produced with a transformation temperature range spanning 20-50° C. (e.g. Mf=20° C. and Af=50° C.). Thus, the SMA alloy ring can be cooled below 20° C., deformed as necessary and held at that temperature (e.g. well below the transformation temperature), until it is installed in the appropriate position. The SMA alloy ring can then be heated to the Af temperature to allow it to exhibit its shape memory behaviour. As will be appreciated, the transformation temperature range of Nitinol makes it practical for installation in most normal engineering environments. Other suitable Ni—Ti alloys may include NiTiFe (e.g. Tinel®), NiTiNb or NiTiCu.

The present disclosure may also extend to an assembly comprising a first member, a second member, wherein at least a portion of the second member surrounds at least a portion of the first member, and at least one sealing ring as discussed above. The sealing ring may be positioned between the first and second member (and around the first member), such that the radially inner sealing portion faces the first member and the radially outer sealing portion faces the second member.

The term "faces" should be understood to mean that the sealing portions are adjacent to, and opposed to, the first and second member surfaces but may or may not be in contact therewith.

The first member may comprise a circumferential outer surface, which may be generally circular in cross-section. The first member may comprise a cylinder, which may be hollow. The first member may comprise a tubular member such as a pipe or tube.

The second member may comprise a housing having a passage for receiving the first member. The passage may comprise a circumferential inner surface, which may be generally circular in cross-section. A cavity may be formed between the inner surface of the housing and the outer surface of the first member. The sealing ring may be configured to seal the cavity. The housing may comprise an aperture or passage in fluid communication with the interior of the first member. The aperture or passage may extend axially and parallel to the interior of the first member, for example, the aperture or passage may be co-axial with the interior.

The radially inner and outer sealing portions may be in sealing engagement with the first and second member, respectively. In particular, the sealing engagement may only be formed once the at least one sealing ring is heated and expanded radially inwardly and outwardly. The term 'sealing engagement' should be understood to mean a generally hermetic seal.

As discussed above, the radially inner and outer sealing portions may be planar. The planar portions may extend parallel to adjacent surfaces of the first and second members.

In one embodiment, the at least one sealing ring may comprise a first sealing ring and a second sealing ring.

The first and second sealing rings may be identical to each other, but may be positioned in different orientations. For example, the first ring may be upside down relative to the second ring. This will mean that at least one peak of the first sealing ring will be generally (axially) aligned with at least one trough of the second sealing ring, and at least one trough of the first sealing ring will be generally (axially) aligned with at least one peak of the second sealing ring.

The first sealing ring may be in contact with the second sealing ring. The first and second rings may thus form a pair of contacting rings.

For example, in the embodiment described above, the peak(s) of a first sealing ring may contact the trough(s) of a second sealing ring and vice versa.

Alternatively, the first and second sealing rings may be not in contact with each other and may be spaced along the first member (in the axial direction).

In another embodiment, the at least one sealing ring may further comprise a third sealing ring and a fourth sealing ring, i.e. at least four sealing rings in total.

The third and fourth sealing rings may have the same features of the first and second rings. For example, the third and fourth sealing rings may be identical rings, oriented differently and in contact with each other. All four rings may be identical. A first pair of rings (comprising the first and second rings) may be spaced along the first member from a second pair of rings (comprising the third and fourth rings).

The assembly may further comprise an annular support member positioned between the first member and the second member.

The annular support member may be thicker in the axial direction than the sealing ring(s). It may be formed from a non-SMA material that may have a thermal coefficient of expansion that is similar to that of the first and second members, so that it expands therewith (during heating or normal use).

The annular support member may be positioned in contact with one or more sealing rings.

The annular support member may be positioned between two pairs of sealing rings (e.g. below the first and second sealing rings and above the third and fourth sealing rings).

Alternatively, the annular support member may be positioned between the first and second sealing rings.

For example, the assembly may be part of a differential pressure flow meter/sensor, suitable for use on an aircraft, and in particular in the air conditioning system of an aircraft.

The present disclosure also extends to a method of creating a seal between a first member and a second member, the method comprising the steps of placing at least a portion of a first member within a second member, such that at least a portion of the second member surrounds the portion of the first member, deforming a SMA sealing ring, at a temperature below the martensitic phase transformation temperature of the SMA, to provide a body having a radially inner sealing portion, a radially outer sealing portion and a wave-like shape comprising at least one peak and at least one trough between the inner and outer sealing portions, placing the sealing ring around the first member, between the first and second members, such that the radially inner sealing portion faces the first member and the radially outer sealing portion faces the second member and heating the sealing ring above the austenitic phase transformation temperature of the SMA to provide a sealing engagement between the radially inner sealing portion and the first member and between the radially outer sealing portion and the second member.

In the method above, the sealing ring or rings, the first and second members and the assembly thereof, may have any of the features discussed above.

BRIEF DESCRIPTION OF THE DRAWINGS

Exemplary embodiments and features of the present disclosure will now be described by way of example only, and with reference to FIGS. 1A to 3, of which.

DETAILED DESCRIPTION OF ONE OR MORE PREFERRED EMBODIMENTS

Figure 1A:
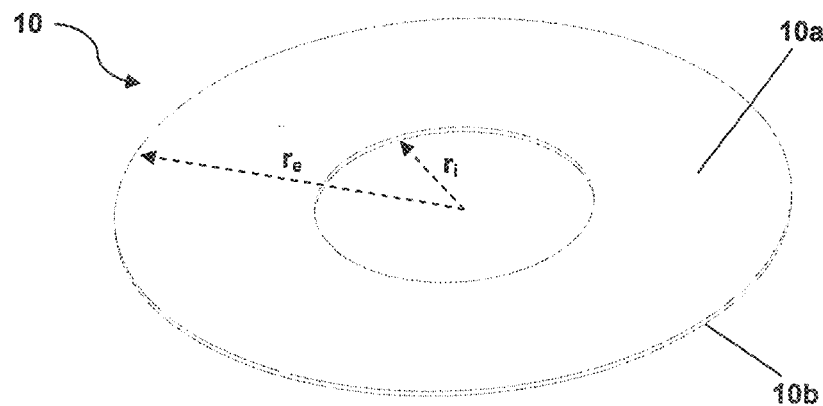
FIG. 1A shows an example SMA sealing ring in its original "hot" state (i.e. in an austenitic phase, without any shaping/deformation)

FIG. 1A shows an example of an SMA sealing ring 10 that may be used in various embodiments of the present disclosure. The SMA sealing ring 10 is shown in its original "hot" state, with an austenite crystal structure (i.e. above its transformation temperature) before it has been deformed. Sealing ring 10 is sized such that its interior radius ri is smaller than the radius of a first member to be sealed within it, whilst the exterior radius re is bigger than the radius of a second member that it will also seal against. In this manner, the "original" shape of SMA sealing ring 10 will more than fill a gap between the two members and thus, the sealing ring 10 will provide a sealing engagement therewith when its shape memory behaviour is activated. Ring 10 has a first planar surface 10a and an opposed second planar surface 10b.

Figure 1B:
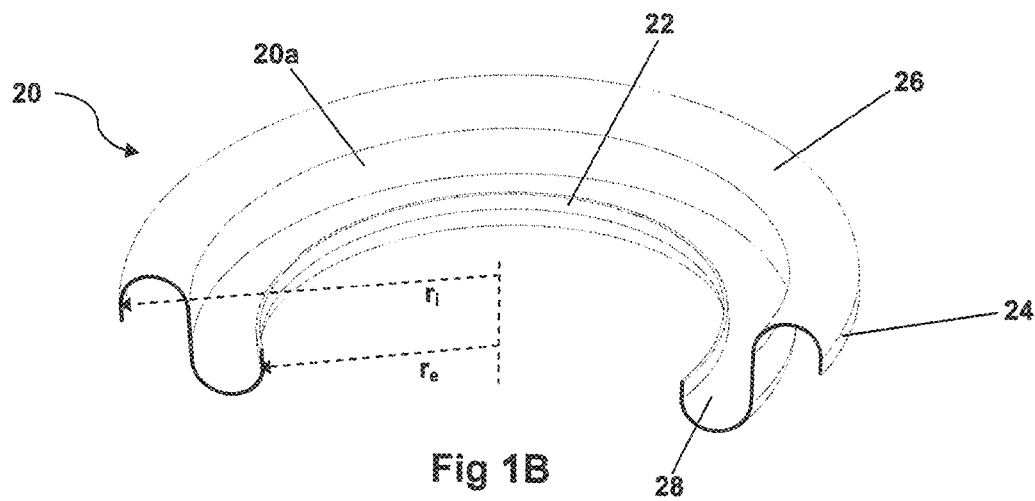
FIG. 1B shows a cut-through view of an example SMA sealing ring in a "cold" and deformed state (i.e. in a martensitic phase and having been shaped/deformed)
Figure 1C:
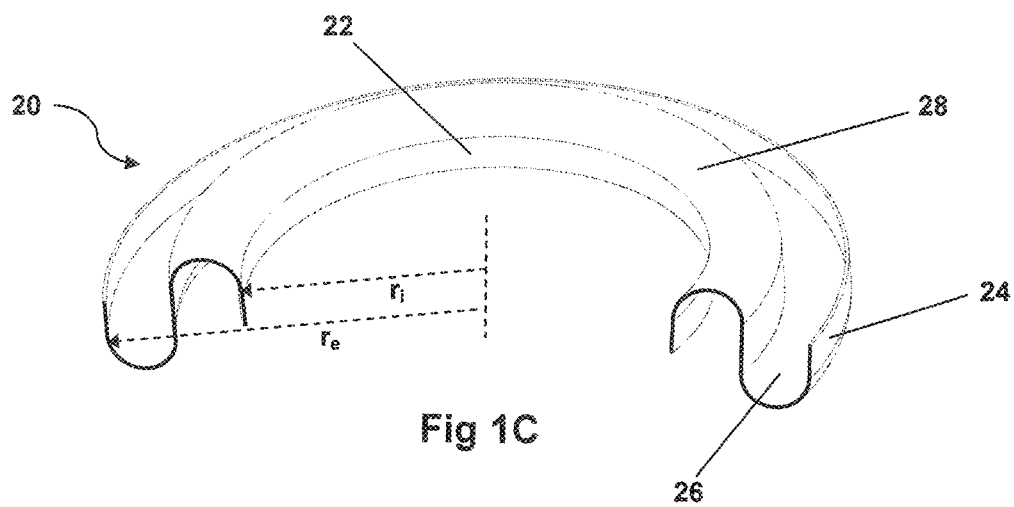
FIG. 1C shows an underside cut-through view of the example SMA sealing ring of FIG. 1B.

FIGS. 1B and 1C show different views of SMA sealing ring 20, which each correspond to SMA sealing ring 10 of FIG. 1 in a "cold" and deformed state. SMA sealing ring 10 has been cooled below its transformation temperature into a martensitic crystal structure, and has been deformed to provide SMA sealing ring 20.

SMA sealing ring 20 includes a radially inner sealing portion 22 and a radially outer sealing portion 24. The radially inner and outer sealing portions 22, 24 are formed at the interior and exterior radius, re and ri, respectively. As will be discussed below in relation to FIG. 3, the radially inner sealing portion 22 is configured to face a first member and the radially outer sealing portion 24 is configured to face a second member, such that the portions 22, 24 are in sealing engagement with the first and second members, respectively, when the shape memory behaviour of the sealing ring 20 is activated. In this way, both portions 22, 24 engage different members.

SMA sealing ring 20 has been deformed to provide an increased inner radius ri and decreased exterior radius re than that of SMA sealing ring 10. This allows SMA sealing ring 20 to fit easier over the first member and between the first and second member to make installation easier.

Sealing ring 20 has opposed surfaces 20a, 20b corresponding to surfaces 10a, 10b of the original ring 10. In the depicted embodiment, a portion of the first surface 20a forms the radially outer sealing portion 24, whilst a portion of the second surface 20b forms the radially inner sealing portion 22. However, in other embodiments, a portion of the first surface 20a may form the radially inner sealing portion 24, whilst a portion of the second surface 20b may form the radially outer sealing portion 22 (i.e. vice versa to that depicted). In still other embodiments, portions of the first surface 20a may form both the radially inner and outer sealing portions 22, 24, or alternatively, portions of the second surface 20b may form both the radially inner and outer sealing portions 22, 24.

In the depicted embodiment, the SMA sealing ring 20 has been deformed to provide a generally S-shaped cross-section between the radially inner sealing portion 22 and the radially outer sealing portion 24. The S-shape is formed of a peak 26 and a trough 28.

SMA sealing ring 10 may be deformed to provide SMA sealing ring 20 using any suitable deformation and/or shaping technique, as is known in the art, for example, by pressing or forging. Deformation may occur bi-directionally in both the axial and radial directions of the SMA sealing ring 10. The axial direction extends parallel to the thickness of the rings 10, 20 perpendicular to the radial direction.

Figure 2A:
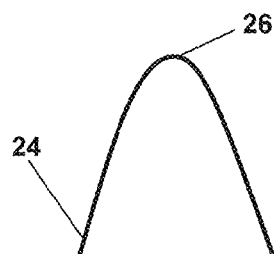
FIG. 2A shows a cross-sectional view of a portion of an SMA sealing ring in accordance with various embodiments.
Figure 2D:
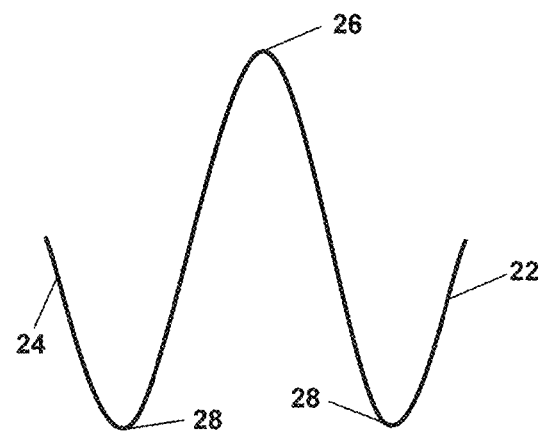
FIG. 2D shows a cross-sectional view of a portion of another alternative SMA sealing ring in accordance with various embodiments.
Figure 2B:
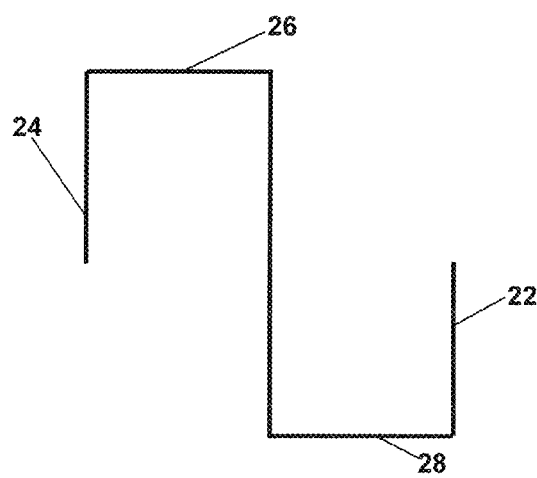
FIG. 2B shows a cross-sectional view of a portion of an alternative SMA sealing ring in accordance with various embodiments.
Figure 2E:
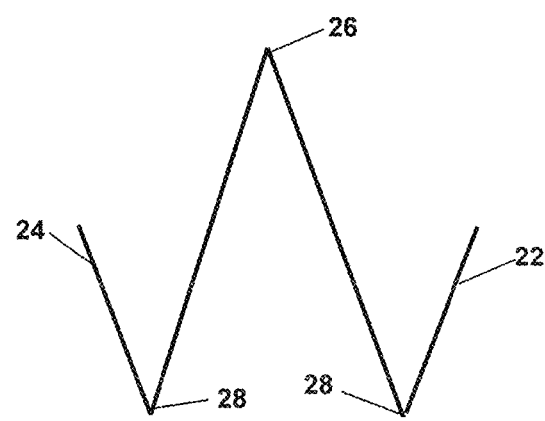
FIG. 2E shows a cross-sectional view of a portion of another alternative SMA sealing ring in accordance with various embodiments.
Figure 2C:
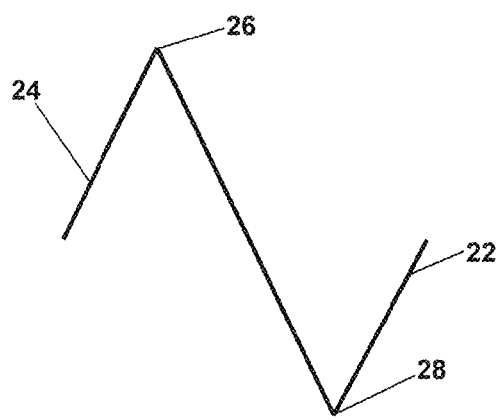
FIG. 2C shows a cross-sectional view of a portion of another alternative SMA sealing ring in accordance with various embodiments.

FIG. 2A shows the shape of the radial cross-section of an SMA sealing ring in accordance with various embodiments. In this specific example, as mentioned above, the shape is that of a general S-shape. In this case, the general S-shape is a curved S-shape. However, a square S-shape may also be used (i.e. a square wave), as is illustrated in FIG. 2B. It is to be understood, that within the scope of this disclosure, any other suitable shape of SMA sealing ring may be used, provided it has at least one peak 26 and at least one trough 28 between the radially inner and radially outer sealing portions 22, 24. For instance, the shape may be a sinusoidal shape, or as illustrated in FIG. 2C, a zigzag shape. Alternatively, general W-shapes, with two troughs 28a, 28b may be used, such as a curved W-shape, as illustrated in FIG. 2D, or a sharp (zigzag) W-shape, as illustrated in FIG. 2E (i.e. a double V-shape). Equally, general M-shapes may be used, which are mirror images of general W-shapes, and have two peaks and one trough.

Figure 2F:
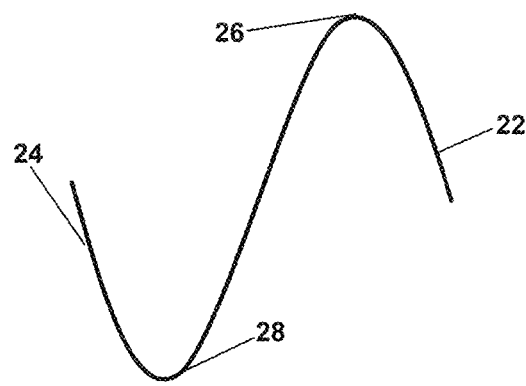
FIG. 2F shows a cross-sectional view of a portion of another alternative SMA sealing ring in accordance with various embodiments.

Of course, all of these shapes could be reversed in the radial direction, or reflected along the radial direction, so that the peaks and troughs change position, as shown in FIG. 2F, which is generally the shape of FIG. 2A reversed.

Figure 3:
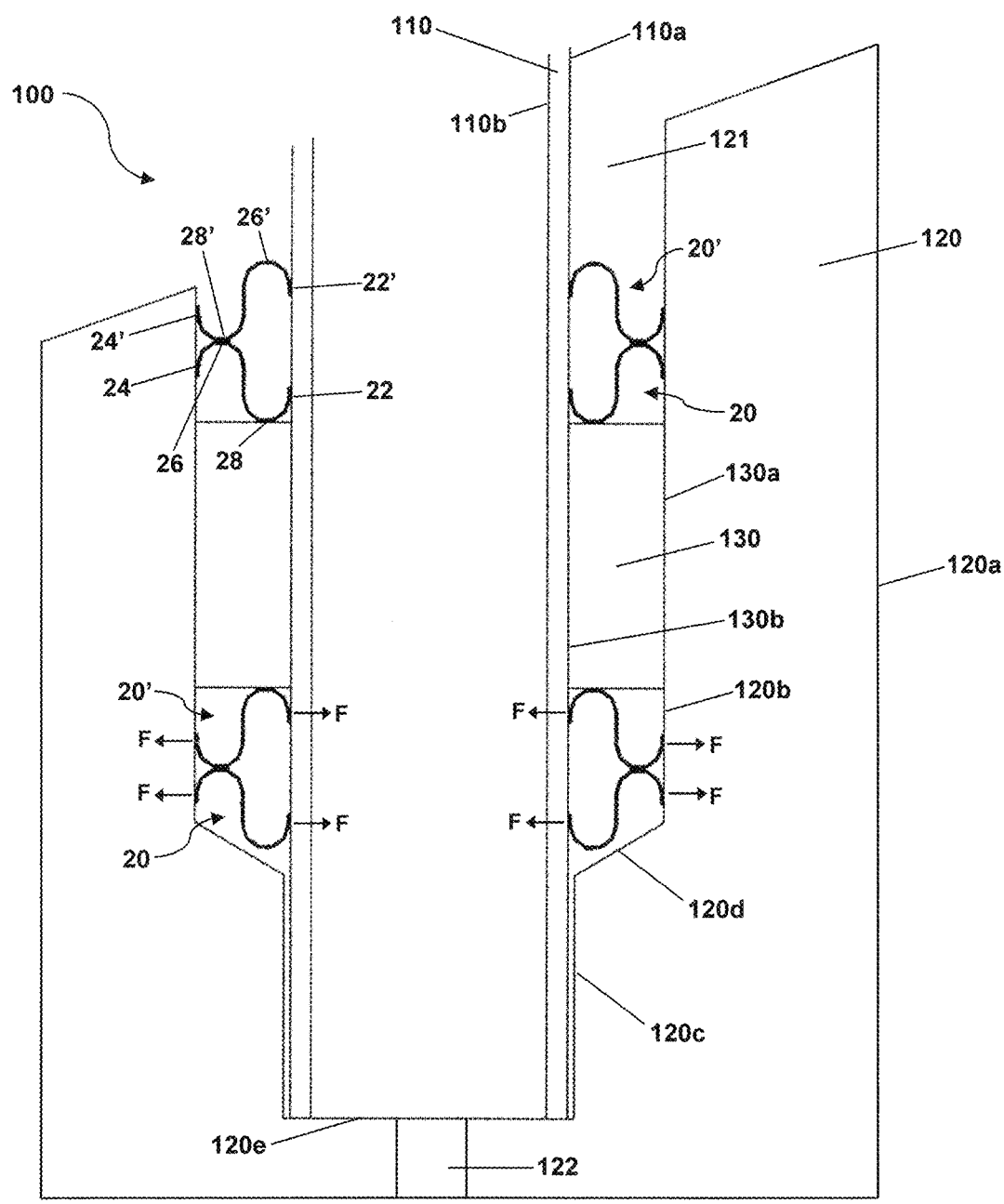
FIG. 3 shows a cross-sectional view of an assembly comprising the SMA sealing ring of FIGS. 1B, 1C and 2A, before heating, in accordance with various embodiments.

FIG. 3 shows an example of an assembly 100 demonstrating the use of SMA sealing rings 20, 20' to provide a sealing connection between a first member, in this case a tube 110, and a second member, in this case a housing 120, in accordance with various embodiments. Such an assembly may be part of a differential pressure flow meter/sensor, e.g. for use on an aircraft to determine an air flow rate. Tube 110 has an outer surface 110a and an inner surface 110b and is disposed within an annular cavity 121 in housing 120. Two pairs of SMA sealing rings 20, 20' are positioned between the tube 110 and the housing 120. Housing 120 has an outer surface 120a and inner surfaces 120b, 120c and 120d, which define cavity 121 and an inner lower surface 120e which is used to support tube 110 within the housing 120. Inner lower surface 120e comprises an aperture 122 to allow fluid communication between tube 110 and another part of an overall device (e.g. such as in a differential pressure flow meter/sensor).

The pairs of sealing rings 20, 20' are separated by an annular support member 130, which has an outer surface 130a and inner surface 130b. The annular support member 130 is configured to fit around tube 110, such that surfaces 130a and 130b are in at least "touching contact" with the inner surface 120b of the housing 120 and the outer surface 110a of the tube 110, respectively. "Touching contact" means that the surfaces 130a, 130b of the annular support member 130 do not provide a sealing engagement between the tube 110 or the housing 120, but do make physical contact therewith. This allows the annular support member 130 to be slid over the tube 110 and into a desired position easily, but also provide load-bearing support between the tube 110 and housing 120. Annular support member 130 may be made of any suitable material given the intended application and operating environment of assembly 100, for instance, a metallic material such as steel, a titanium-based alloy or a nickel-based alloy for aerospace componentry.

SMA sealing ring 20' is identical to SMA sealing ring 20, but is turned upside down for installation around tube 110. In this way, SMA sealing ring 20' can be said to be a "mirror image" of SMA sealing ring 20 about its radial axis (i.e. reflected about the radial direction). When provided as a pair of sealing rings, such as in the presently depicted embodiment, the SMA sealing rings 20, 20' form a complementary pair, where the peak 26' and trough 28' of the upper ring 20' are aligned with the trough 28 and peak 26 of the lower ring 20, respectively.

SMA sealing rings 20, 20' are shown installed over tube 110 and positioned between housing 120 and tube 110 in a "cold" deformed state, such as explained above in relation to FIGS. 1B and 1C. Once installed in the correct position, the temperature of the SMA sealing rings 20, 20' may be raised above the transformation temperature of the SMA. Above the transformation temperature, the SMA will attempt to revert back to its original "hot" pre-deformed shape, such as described above in relation to FIG. 1A. This will cause the radially outer sealing portions 24, 24' to be forced into sealing engagement with the inner surface 120b of the housing 120, and the radially inner sealing portions 22, 22' to be forced into sealing engagement with outer surface 110a of the tube 110, as shown by radial arrows F.

Due to the general S shape formed between the sealing portions 22, 22', 24, 24', the SMA sealing rings 20, 20' will be forced against both the inner surface 120b of the housing 120 and the outer surface 110a of the tube 110 to provide a particularly effective sealing engagement. In addition, the sealing portions 22, 22', 24, 24' may be configured to be planar and extend parallel to the axial direction after heating. In this manner, sealing portions 22, 22', 24, 24' may improve the sealing engagement between the tube 110 and housing 120, as well as spread the sealing force over a larger area to avoid crimping the tube 110.

The complementary nature of the SMA sealing ring pairs 20, 20' shown in FIG. 3 will tend to balance out any rotational force imparted to the tube 110 by the sealing force of the SMA sealing rings 20, 20'. Rotational forces and stresses can also be further balanced out and/or sealing redundancy can be provided, by using additional complementary ring pairs (as shown in FIG. 3).

In addition, as mentioned above, annular support member 130 may provide load-bearing support for tube 110 inside housing 120, and prevent unwanted rotation of the tube 110 before and after sealing, as well as relieve some of the stress applied to the tube 110 and housing 120 by the SMA sealing rings 20, 20'.

In other embodiments, only a single SMA sealing ring may be needed, or a single complementary pair of SMA sealing rings, either adjacent to each other or spaced apart, with no annular support member therebetween. It is to be appreciated that any number of SMA sealing rings, complementary pairs, annular support members and relative spacing and positioning thereof may be used without departing from the scope of this disclosure.

As discussed above, the SMA sealing ring may comprise a Nitinol alloy.

Although the figures and the accompanying description describe particular embodiments and examples, it is to be understood that the scope of this disclosure is not to be limited to such specific embodiments, and is, instead, to be determined by the following claims.

The invention claimed is:

1. An assembly comprising:
   a first member;
   a second member, wherein at least a portion of the second member surrounds at least a portion of the first member; and
   at least one sealing ring having shape memory alloy (SMA) body extending from a radially inner sealing portion to a radially outer sealing portion in a wave-like shape comprising at least one peak and at least one trough and positioned between the first and second member, such that the radially inner sealing portion faces the first member and the radially outer sealing portion faces the second member, wherein the inner and outer sealing portions are planar, wherein the inner and outer sealing portions extend parallel to an axial direction of the sealing ring;

wherein the at least one sealing ring comprises a first sealing ring and a second sealing ring;

wherein the first and second sealing rings are arranged such that at least one peak of the first sealing ring is aligned with at least one trough of the second sealing ring, and at least one trough of the first sealing ring is aligned with at least one peak of the second sealing ring; and wherein the first sealing ring is in contact with the second sealing ring.

2. The sealing ring of claim 1, comprising first and second opposed surfaces, each extending from the radially inner sealing portion to the radially outer sealing portion, wherein a portion of the first surface defines the radially outer sealing portion and a portion of the second surface defines the radially inner sealing portion.

3. The sealing ring of claim 1, wherein the wave-like shape is generally S-shaped.

4. The sealing ring of claim 1, wherein the wave-like shape is generally sinusoidal.

5. The sealing ring of claim 1, wherein the ring is configured such that heating the ring above the transformation temperature of the SMA causes the radially inner sealing portion to move radially inwardly and the radially outer sealing portion to move radially outwardly.

6. The assembly of claim 1, wherein the radially inner and outer sealing portions are in sealing engagement with the first and second member, respectively.

7. The assembly of claim 1, wherein the at least one sealing ring further comprises a third sealing ring and a fourth sealing ring.

8. The assembly of claim 1, further comprising an annular support member positioned between the first member and the second member and separating the first and second sealing rings.

9. The method of claim 1, wherein the SMA comprises an NiTi alloy.

10. A method of creating a seal between a first member and a second member, the method comprising the steps of:

placing at least a portion of a first member within a second member, such that at least a portion of the second member surrounds the portion of the first member;

deforming a shape memory alloy (SMA) sealing ring, at a temperature below the martensitic phase transformation temperature of the SMA, to provide a body having a radially inner sealing portion, a radially outer sealing portion and a wave-like shape comprising at least one peak and at least one trough between the inner and outer sealing portions, wherein the inner and outer sealing portions are planar and wherein the inner and outer sealing portions extend parallel to an axial direction of the sealing ring placing the deformed sealing ring around the first member, between the first and second members, such that the radially inner sealing portion faces the first member and the radially outer sealing portion faces the second member; and heating the deformed sealing ring above the austenitic phase transformation temperature of the SMA to provide a sealing engagement between the radially inner sealing portion and the first member and between the radially outer sealing portion and the second member;

wherein the SMA sealing ring comprises a first sealing ring and a second sealing ring;

wherein the first and second sealing rings are arranged such that at least one peak of the first sealing ring is aligned with at least one trough of the second sealing ring, and at least one trough of the first sealing ring is aligned with at least one peak of the second sealing ring; and wherein the first sealing ring is in contact with the second sealing ring.

11. The assembly of claim 10, wherein the SMA comprises an NiTi alloy.

* * * * *